(12) United States Patent
Bashyam et al.

(10) Patent No.: US 11,784,337 B2
(45) Date of Patent: Oct. 10, 2023

(54) MEMBRANE ELECTRODE ASSEMBLY WITH ENHANCED START-UP AND SHUT-DOWN DURABILITY

(71) Applicant: HYZON MOTORS INC., Honeoye Falls, NY (US)

(72) Inventors: Rajesh Bashyam, Delta (CA); Zhai Jun, Shanghai (CN)

(73) Assignee: HYZON MOTORS INC., Honeoye Falls, NY (US)

( * ) Notice: Subject to any disclaimer, the term of this patent is extended or adjusted under 35 U.S.C. 154(b) by 37 days.

(21) Appl. No.: 17/482,568

(22) Filed: Sep. 23, 2021

(65) Prior Publication Data

US 2022/0102745 A1  Mar. 31, 2022

Related U.S. Application Data

(60) Provisional application No. 63/084,359, filed on Sep. 28, 2020.

(51) Int. Cl.
| | | |
|---|---|---|
| *H01M 8/1004* | (2016.01) | |
| *H01M 4/92* | (2006.01) | |
| *H01M 8/0297* | (2016.01) | |
| *H01M 8/04223* | (2016.01) | |
| *H01M 4/90* | (2006.01) | |

(52) U.S. Cl.
CPC ....... *H01M 8/1004* (2013.01); *H01M 4/9083* (2013.01); *H01M 4/921* (2013.01); *H01M 8/0297* (2013.01); *H01M 8/04223* (2013.01); H01M 2250/20 (2013.01)

(58) Field of Classification Search
CPC .. H01M 8/1004; H01M 4/9083; H01M 4/921; H01M 8/0297; H01M 8/04223; H01M 2250/20; H01M 4/8652; H01M 4/8657; H01M 4/9016; H01M 4/926
See application file for complete search history.

(56) References Cited

U.S. PATENT DOCUMENTS

| | | | |
|---|---|---|---|
| 8,435,921 B2 * | 5/2013 | Matolin | H01M 4/9016 |
| | | | 502/344 |
| 9,093,697 B2 | 7/2015 | Uehara et al. | |
| 2009/0220829 A1 * | 9/2009 | Lopes Correia Tavares | |
| | | | H01M 8/126 |
| | | | 429/534 |
| 2010/0209811 A1 | 8/2010 | Barnwell et al. | |
| 2012/0122014 A1 | 5/2012 | Brinkman | |

(Continued)

OTHER PUBLICATIONS

Written Opinion of the International Searching Authority dated Feb. 28, 2022.

(Continued)

*Primary Examiner* — Stewart A Fraser
(74) *Attorney, Agent, or Firm* — Jacob M. Ward; Ward Law Office LLC

(57) ABSTRACT

A membrane electrode assembly (MEA) includes a membrane, a cathode catalyst layer, a cathode co-catalyst layer including a hydrogen reservoir, an anode catalyst layer, and an anode co-catalyst layer including a hydrogen reservoir. The anode co-catalyst layer and the cathode co-catalyst layer cap a cathode potential at lower than 1.5V and an anode potential at lower than 1.0V. The anode co-catalyst layer and the cathode co-catalyst layer can include a platinum doped rare earth oxide, such as platinum doped cerium oxide.

20 Claims, 3 Drawing Sheets

(56) References Cited

U.S. PATENT DOCUMENTS

| | | | |
|---|---|---|---|
| 2012/0231366 A1* | 9/2012 | Wachsman | H01M 8/126 429/525 |
| 2017/0149079 A1* | 5/2017 | Papandrew | H01M 4/8673 |
| 2017/0155163 A1* | 6/2017 | O'Malley | H01M 4/926 |
| 2020/0280074 A1 | 9/2020 | Kim et al. | |

OTHER PUBLICATIONS

Figure 2:
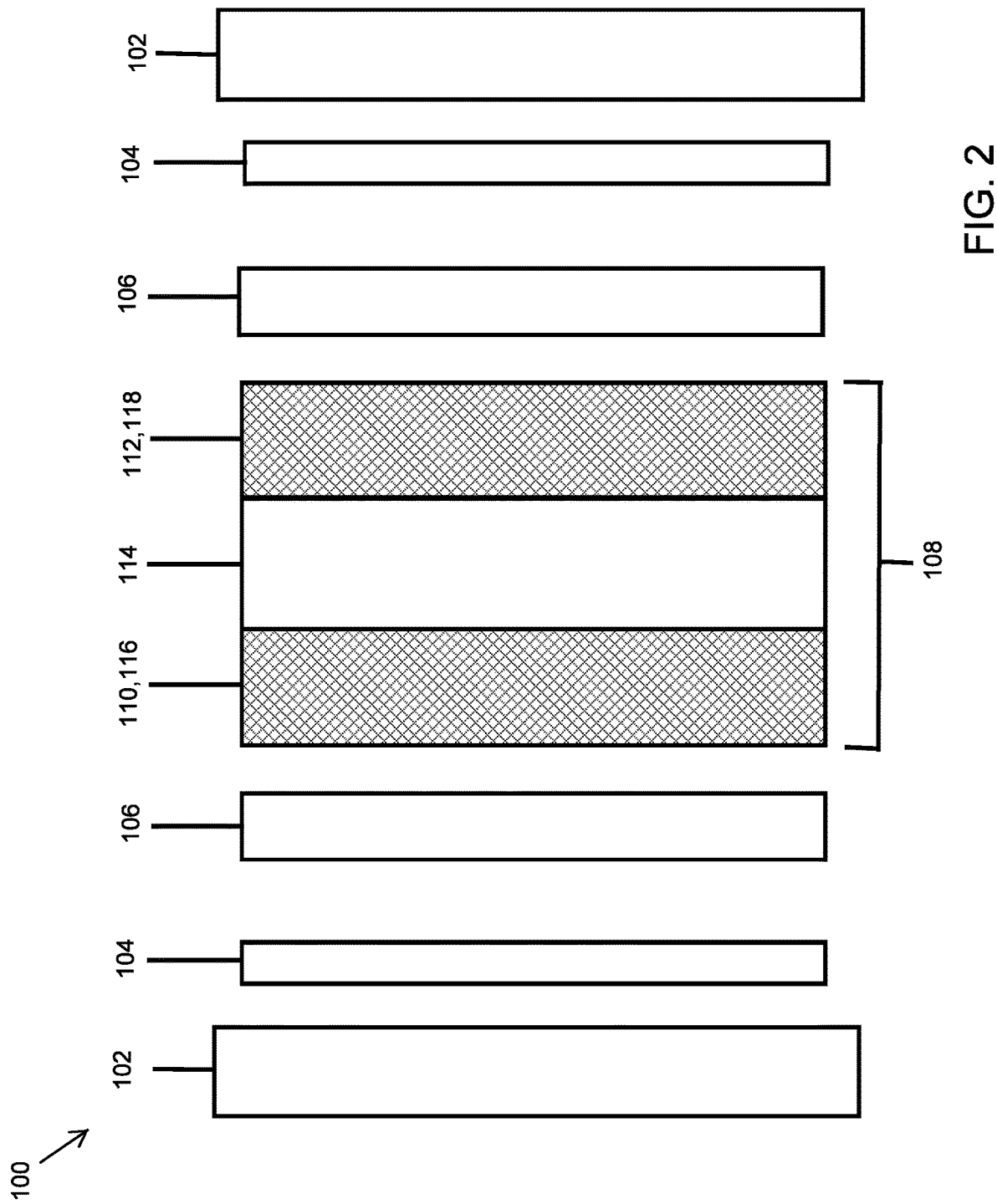

Vorokhta "Investigation of magnetron sputtered Pt—CeO2 thin film catalyst for fuel cell applications" 2013, pp. 1-84, p. 4, para 2, p. 30, para 2, Figure 2.1.1-Figure 2.1.2, p. 10, para 2, p. 9, para 3, p. 38, para 1-2, p. 58, para 1, p. 7, para 2.

\* cited by examiner

MEMBRANE ELECTRODE ASSEMBLY WITH ENHANCED START-UP AND SHUT-DOWN DURABILITY

CROSS-REFERENCE TO RELATED APPLICATIONS

This application claims the benefit of U.S. Provisional Application Ser. No. 63/084,359 filed on Sep. 28, 2020. The entire disclosure of the above application is hereby incorporated herein by reference.

FIELD

The present disclosure relates generally to fuel cells, and more particularly, to fuel cells having a membrane electrode assembly with enhanced start-up and shut-down durability.

INTRODUCTION

This section provides background information related to the present disclosure which is not necessarily prior art.

Fuel cells have become an important renewable energy option. However, fuel cell technology is still developing, and there are numerous key areas in which fuel cell technology must improve relating to fuel cell efficiency, lifespan, and manufacturing costs. For example, during normal operation of a fuel cell, anode potential is close to zero volts. However, during start-up and shut-down of a fuel cell, anode and cathode potential can be increased to more than 1.0V and 1.5V, respectively. This can lead to corrosion and degradation of the cathode and anode, leading to an overall shorter lifespan of the fuel cell. This can be especially problematic for fuel cells that are used in technology requiring frequent start-up and shut-down during normal operation, for example, in vehicles.

Various methods for increasing the lifespan of a fuel cell are known. For example, the functionality and durability of the membrane electrode assembly can be improved. In one example, hydrogen circulation can be used throughout the membrane electrode assembly in order to minimize degradation of the membrane electrode assembly during start-up and shut-down of the fuel cell. However, hydrogen circulation can be costly and adds complexity to the overall fuel cell system.

Accordingly, there is a continuing need for a membrane electrode assembly that is durable and has an improved lifespan despite frequent start-up and shut-down during normal operation of the fuel cell. Desirably, improvements in technology related to the membrane electrode assembly would not result in fuel cells that are overly complex or costly to manufacture.

SUMMARY

In concordance with the instant disclosure, a membrane electrode assembly that is durable, has an improved lifespan, and is not overly complex or costly to manufacture, has been surprisingly discovered.

In certain embodiments, a membrane electrode assembly (MEA) is provided that includes a proton exchange membrane disposed between two electrode layers and a noble metal doped rare-earth oxide. The electrode layers may include an anode layer and a cathode layer. The anode layer may include a catalyst having platinum disposed on a high-surface area carbon support. The noble metal doped rare-earth oxide may include platinum doped cerium oxide. The noble metal doped rare-earth oxide may be provided as a layer adjacent the anode layer or the noble metal doped rare-earth oxide may be integrated into the anode layer.

The MEA can be used in various ways. Embodiments include methods where the MEA includes a proton exchange membrane disposed between two electrode layers and a noble metal doped rare-earth oxide. The method may also include switching the fuel cell from one of a start-up state and a shut-down state to the other of the start-up state and the shut-down state. The noble metal doped rare-earth oxide may also provide a reservoir of hydrogen.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only and are not intended to limit the scope of the present disclosure in any way.

Figure 1:
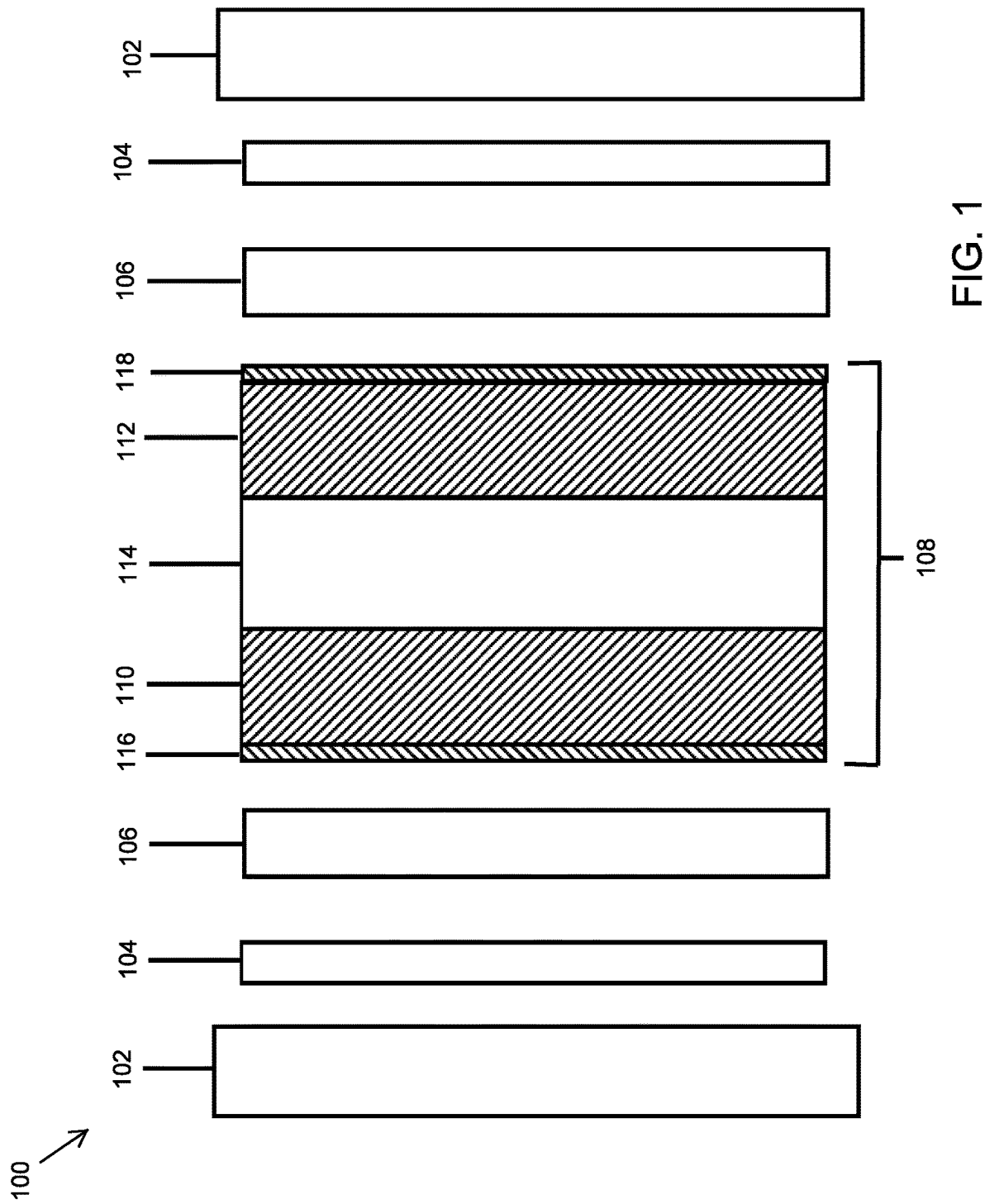
Figure 3:
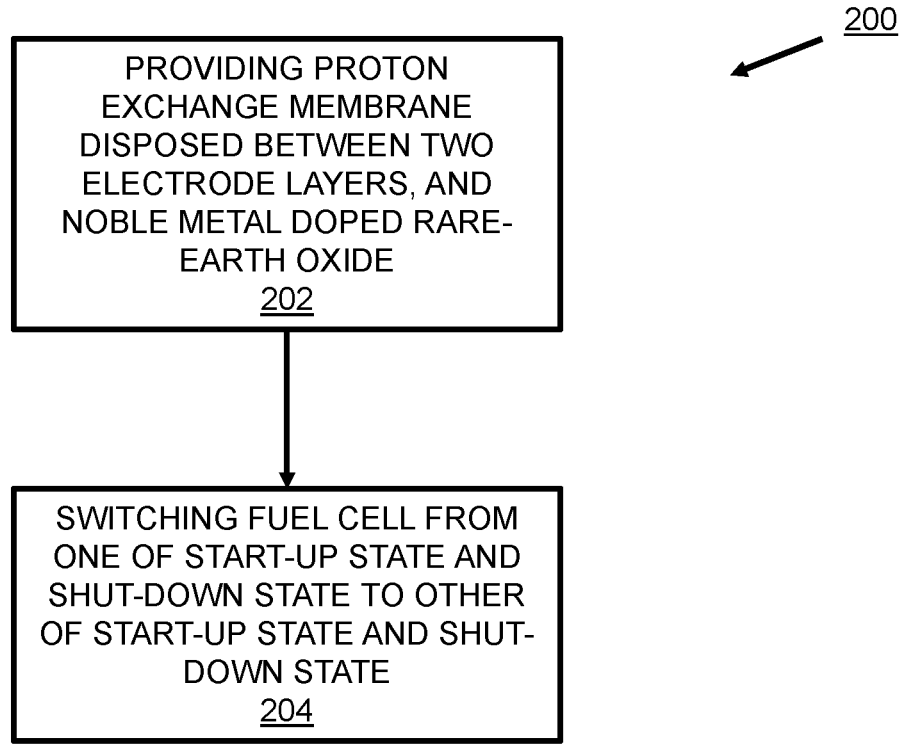

FIG. 1 is a partially exploded schematic view of a fuel cell showing the membrane electrode assembly and the catalyst and co-catalyst layers according to one embodiment of the present technology;

FIG. 2 is a partially exploded schematic view of a fuel cell showing the membrane electrode assembly and the catalyst and co-catalyst layers according to another embodiment of the present technology; and FIG. 3 is a flowchart of a method for using the fuel cell having the membrane electrode assembly and the catalyst and co-catalyst layers, as shown in FIGS. 1-2, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A fuel cell can include bipolar plates, gaskets, and a membrane electrode assembly (MEA). Where the fuel cell is isolated or positioned at the end of a fuel cell stack, one or both the bipolar plates can be replaced by end plates. Fuel cells placed in between adjacent fuel cells in a fuel cell stack can be flanked by bipolar plates. As a non-limiting example, the fuel cell can be part of a fuel cell stack that can be used to provide electric power in a vehicle. However, it should be appreciated that a skilled artisan can employ fuel cells with various structures and applications, within the scope of this disclosure.

The bipolar plates are configured to surround the MEA, and can be used to connect multiple MEAs of multiple fuel cells in series by stacking them relative to each other, thereby creating a fuel cell stack. This configuration can be employed to provide a desired output voltage. The bipolar plates can be manufactured from metal, carbon, or composites. Each of the bipolar plates can also include a flow field. The flow field can be a set of channels machined or stamped into the plates to permit fluid flow over the MEA. It should be appreciated that one skilled in the art can employ different bipolar plates, as desired.

Gaskets can be disposed between the bipolar plates and the MEA and can be configured to provide a fluid-tight seal to the MEA. The gaskets can be manufactured from an elastomer or polymer or any other material suitable for forming a gas-tight seal. In certain embodiments, the gasket can be formed of a sealant or can include a sealant. It should be appreciated that a skilled artisan can employ different gaskets, within the scope of this disclosure.

The MEA includes a membrane separating electrode layers (e.g., anode and cathode layers), where the electrode layers can include a catalyst. The membrane can include a polymer electrolyte membrane (PEM), also known as a proton exchange membrane. The PEM is configured to be permeable to protons while acting as an electric insulator and reactant fluid barrier, e.g., barrier to oxygen and hydrogen gas. In certain circumstances, the PEM may be disposed between two electrode layers. The MEA may also include a noble metal doped rare-earth oxide. The noble metal doped rare-earth oxide may include platinum doped cerium oxide. It should be appreciated that one skilled in the art can select other types of membranes, as desired.

In certain circumstances, the noble metal doped rare-earth oxide may be provided as a layer adjacent one of the electrode layers. Alternatively, the noble metal doped rare-earth oxide may be integrated into one of the electrode layers. For example, the noble metal doped rare-earth oxide may be provided as a layer adjacent the anode layer or the noble metal doped rare-earth oxide may be integrated into the anode layer. In a specific example, the two electrode layers may include an anode layer and a cathode layer. For instance, the cathode layer can be disposed adjacent to one side of the membrane and the anode layer can be disposed adjacent to another side of the membrane. Each of the electrode layers can include a catalyst, such as particles of platinum (Pt) disposed on a high-surface-area carbon support, which can include various types of carbon particles. In a specific example, the catalyst and the noble metal doped rare-earth oxide may be disposed on different particles. Alternatively, the catalyst and the noble metal doped rare-earth oxide may be disposed on the same particles.

Other noble group metals can also be used for the catalyst. Each electrode can include the platinum catalyst deposited on the carbon support, admixed with an ion-conducting polymer (ionomer), and disposed between the membrane and the gas diffusion layers. The anode layer enables hydrogen molecules to dissociate into protons and electrons. The cathode catalyst layer enables oxygen reduction by reacting with the protons generated by the anode, producing water. The ionomer mixed into the electrode layers allows the protons to travel through these layers.

Gas diffusion layers (GDLs) can be disposed between each of the electrode layers and the bipolar plates, where the GDLs can facilitate transport of reactants into each catalyst layer and the removal of water at the cathode. The GDLs can be porous, allowing gasses to diffuse rapidly through the pores to reach the respective electrode layer. An inner surface of the gas diffusion layer can include a microporous layer coated with a thin layer of high-surface-area carbon mixed with polytetrafluoroethylene (PTFE). The microporous layer can help adjust the balance between water retention (needed to maintain membrane conductivity) and water release (needed to keep the pores open so hydrogen and oxygen can diffuse into the electrodes). It should be appreciated that a person skilled in the art can select other types of gas diffusion layers, within the scope of this disclosure. It should also be appreciated that the gas diffusion layers can be incorporated into the electrode layers.

At least one co-catalyst can be included in the membrane electrode assembly. In certain embodiments the co-catalyst can be provided as a separate layer relative to one or both of the electrodes. It is also possible to have the co-catalyst incorporated into one or both of the electrodes. Further embodiments include where separate co-catalyst layers are provided relative to one or both of the electrodes and one or both of the electrode also includes the co-catalyst incorporated therein. In certain embodiments, the anode layer includes the co-catalyst as a separate co-catalyst layer and/or where the co-catalyst is incorporated in the anode layer.

In certain embodiments, the co-catalyst layer can include a platinum (Pt) doped rare earth oxide and can function as a hydrogen reservoir. The Pt doped rare earth oxide can be disposed on a carbon support, such as a high-surface area carbon support. Examples of rare-earth oxides include oxides of scandium, yttrium, lanthanum, cerium, praseodymium, neodymium, promethium, samarium, europium, gadolinium, terbium, dysprosium, holmium, erbium, thulium, ytterbium, and lutetium. In certain embodiments, Pt doped cerium oxide (with different Pt doping levels) can be used. In certain embodiments, Pt doped cerium (IV) oxide with a carbon support is used, which can participate in the hydrogen oxidation reaction and can function as a hydrogen reservoir catalyst.

The co-catalyst can also be integrated into the cathode layer and/or provided as a separate co-catalyst layer with respect to the cathode layer, according to various embodiments. In certain embodiments, the Pt doped rare earth oxide can be disposed on the same carbon support at the catalyst Pt particles of the anode and/or cathode layers. It should be appreciated that a skilled artisan can include other elements, components, and various types of additives with the co-catalyst, as desired, and the co-catalyst can be utilized for different functions, within the scope of this disclosure.

The hydrogen reservoir created by the co-catalyst at the anode in the membrane electrode assembly can cap the cathode potential at less than 1.5 V by providing additional hydrogen at the anode layer. As a result, the start-up and shut-down durability of the fuel cell is enhanced, and the overall lifespan of the fuel cell is improved. In certain embodiments, the anode potential can be capped at less than 1.0 V where a hydrogen reservoir is included with the co-catalyst provided at the anode layer. Additionally, cerium ions in the co-catalyst can act as radical scavengers, thereby improving an overall chemical stability and lifespan of the membrane of the MEA.

The MEA can be used in various ways. Embodiments include methods where an MEA is provided that includes a proton exchange membrane disposed between two electrode layers and a noble metal doped rare-earth oxide. The method may also include switching the fuel cell from one of a start-up state and a shut-down state to the other of the start-up state and the shut-down state. The noble metal doped rare-earth oxide may also provide a reservoir of hydrogen. In certain circumstances, the electrode layers may include an anode layer and a cathode layer. The anode layer may include a catalyst including platinum disposed on a high-surface area carbon support. The noble metal doped rare-earth oxide may include platinum doped cerium oxide. The noble metal doped rare-earth oxide may be provided as a layer adjacent the anode layer or the noble metal doped rare-earth oxide may be integrated into the anode layer. The reservoir of hydrogen may be configured to maintain a cathode potential at less than 1.5 V and an anode potential at less than 1.0 V.

Advantageously, the membrane electrode assembly is durable and has an improved lifespan despite frequent start-up and shut-down during normal operation of the fuel cell. Additionally, the fuel cell including the MEA provided herein is not overly complex or costly to manufacture.

Examples

Example embodiments of the present technology are provided with reference to the several figures enclosed herewith.

Non-limiting examples of fuel cells including embodiments of a membrane electrode assembly constructed in accordance with the present technology are shown in FIGS. 1-2. However, it should be appreciated that a skilled artisan can employ fuel cells with different structures, within the scope of this disclosure.

FIG. 1 depicts a fuel cell 100 having plates 102, gaskets 104, gas diffusion layers (GDLs) 106, and a membrane electrode assembly 108. The membrane electrode assembly 108 can include a cathode catalyst layer 110, an anode catalyst layer 112, and a membrane 114. In certain circumstances, the membrane electrode assembly 108 may also include a cathode co-catalyst layer 116 and an anode co-catalyst layer 118. As shown in FIG. 1, the cathode catalyst layer 110 can be separate from the cathode co-catalyst layer 116. With further reference to FIG. 1, the anode catalyst layer 112 can be separate from the anode co-catalyst layer 118. Alternatively, as shown in FIG. 2, the cathode catalyst layer 110 can be integrally disposed with the cathode co-catalyst layer 116. With further reference to FIG. 2, the anode catalyst layer 112 can be integrally disposed with the anode co-catalyst layer 118.

In certain circumstances, the membrane electrode assembly can be used in various ways. As shown in FIG. 3, certain embodiments include a method 200 that can include a step 202 of providing an MEA including a proton exchange membrane disposed between two electrode layers and a noble metal doped rare-earth oxide. The method 200 may further include a step 204 of switching the fuel cell from one of a start-up state and a shut-down state to the other of the start-up state and the shut-down state, wherein the noble metal doped rare-earth oxide provides a reservoir of hydrogen.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A membrane electrode assembly, comprising:
   a proton exchange membrane disposed between two electrode layers, wherein one of the electrode layers includes a catalyst including a noble metal, the catalyst including the noble metal disposed on a carbon support; and
   a co-catalyst including a noble metal doped rare-earth oxide, wherein the noble metal doped rare-earth oxide is configured to provide a hydrogen reservoir and maintain a cathode potential at less than 1.5 V and an anode potential at less than 1.0 V when a fuel cell including the membrane electrode assembly is switched from one of a start-up state and a shut-down state to the other of the start-up state and the shut-down state.

2. The membrane electrode assembly of claim 1, wherein the noble metal doped rare-earth oxide includes platinum doped cerium oxide.

3. The membrane electrode assembly of claim 1, wherein the noble metal doped rare-earth oxide is provided as a layer adjacent one of the electrode layers.

4. The membrane electrode assembly of claim 1, wherein the noble metal doped rare-earth oxide is integrated into one of the electrode layers.

5. The membrane electrode assembly of claim 1, wherein the catalyst including the noble metal disposed on the carbon support includes platinum.

6. The membrane electrode assembly of claim 1, wherein the one of the electrode layers includes the noble metal doped rare-earth oxide disposed on the carbon support.

7. The membrane electrode assembly of claim 6, wherein the carbon support is in a form of particles.

8. The membrane electrode assembly of claim 7, wherein the catalyst and the noble metal doped rare-earth oxide are disposed on different particles.

9. The membrane electrode assembly of claim 7, wherein the catalyst and the noble metal doped rare-earth oxide are disposed on same particles.

10. The membrane electrode assembly of claim 1, wherein each electrode layer includes an ionomer.

11. The membrane electrode assembly of claim 1, wherein:
    the electrode layers include an anode layer and a cathode layer, the anode layer including a catalyst including platinum disposed on a carbon support;
    the noble metal doped rare-earth oxide includes platinum doped cerium oxide, and
    the noble metal doped rare-earth oxide is provided as a layer adjacent the anode layer or the noble metal doped rare-earth oxide is integrated into the anode layer.

12. The membrane electrode assembly of claim 11, wherein the noble metal doped rare-earth oxide is integrated into the anode layer, the carbon support is in a form of particles, and the catalyst and the noble metal doped rare-earth oxide are disposed on same particles.

13. The membrane electrode assembly of claim 11, wherein the noble metal doped rare-earth oxide is integrated into the anode layer, the carbon support is in a form of particles, and the catalyst and the noble metal doped rare-earth oxide are disposed on different particles.

14. A fuel cell comprising a membrane electrode assembly according to claim 1.

15. A fuel stack comprising a fuel cell including a membrane electrode assembly according to claim 1.

16. A vehicle comprising a fuel cell including a membrane electrode assembly according to claim 1.

17. The membrane electrode assembly of claim 1, wherein a gas diffusion layer is incorporated into the one of the electrode layers including the catalyst including the noble metal.

18. The membrane electrode assembly of claim 17, further comprising a pair of plates sandwiching the membrane electrode assembly.

19. A method of operating a fuel cell, the method comprising:
    providing the fuel cell including a membrane electrode assembly, the membrane electrode assembly including:
        a proton exchange membrane disposed between two electrode layers, wherein one of the electrode layers includes a catalyst including a noble metal, the catalyst including the noble metal disposed on a carbon support;
        a co-catalyst including a noble metal doped rare-earth oxide, wherein the noble metal doped rare-earth oxide is configured to provide a hydrogen reservoir and maintain a cathode potential at less than 1.5 V and an anode potential at less than 1.0 V; and
    switching the fuel cell from one of a start-up state and a shut-down state to the other of the start-up state and the shut-down state, wherein the noble metal doped rare-earth oxide provides a reservoir of hydrogen.

20. The method of claim 19, wherein:
    the electrode layers include an anode layer and a cathode layer, the anode layer including a catalyst including platinum disposed on a carbon support;
    the noble metal doped rare-earth oxide includes platinum doped cerium oxide; and
    the noble metal doped rare-earth oxide is provided as a layer adjacent the anode layer or the noble metal doped rare-earth oxide is integrated into the anode layer.

* * * * *

UNITED STATES PATENT AND TRADEMARK OFFICE
CERTIFICATE OF CORRECTION

PATENT NO. : 11,784,337 B2
APPLICATION NO. : 17/482568
DATED : October 10, 2023
INVENTOR(S) : Rajesh Bashyam and Zhai Jun It is certified that error appears in the above-identified patent and that said Letters Patent is hereby corrected as shown below:

On the Title Page

Item (72) Inventors, Please update the listing as follows:
Rajesh Bashyam Delta (CA)
Jun Zhai Shanghai (CN)

Signed and Sealed this
Sixth Day of May, 2025

Coke Morgan Stewart
*Acting Director of the United States Patent and Trademark Office*